United States Patent [19]

Gilbert

[11] Patent Number: 4,514,909
[45] Date of Patent: May 7, 1985

[54] MITER GAUGE

[76] Inventor: Curtis R. Gilbert, 501 W. Gilbert, Viroqua, Wis. 54665

[21] Appl. No.: 520,998

[22] Filed: Aug. 8, 1983

[51] Int. Cl.³ .......................... B26D 7/06; B43L 7/06
[52] U.S. Cl. ...................................... 33/471; 33/469; 33/497; 83/437
[58] Field of Search ................. 33/1 N, 403, 418, 468, 33/469, 471, 495–497, 500; 83/437, 477.2, 581

[56] References Cited

U.S. PATENT DOCUMENTS

| | | | |
|---|---|---|---|
| 1,060,466 | 4/1913 | Leloup | 33/495 |
| 1,669,258 | 5/1928 | Luoma | 33/495 |
| 1,902,270 | 3/1933 | Tate | 33/468 |
| 1,985,614 | 12/1934 | Merrigan | 33/500 |
| 2,010,882 | 8/1935 | Ocenasek | 33/500 |
| 2,502,124 | 3/1950 | Bray | 83/477.2 |
| 4,158,320 | 6/1979 | Kay | 83/437 |

FOREIGN PATENT DOCUMENTS 254397 9/1911 Fed. Rep. of Germany ........ 33/403

Primary Examiner—Richard R. Stearns
Attorney, Agent, or Firm—Ronald M. Anderson

[57] ABSTRACT

An improved miter gauge having means for establishing the angle of a workpiece relative to a tool such as a table saw, with increased resolution and accuracy. The miter gauge includes a guide bar adapted to slidingly engage a groove in the tool. A reference frame having a flat surface against which the workpiece is held, is pivotally mounted on the guide bar. A rotatably mounted angle index dial, graduated to show the miter angle at which the gauge is set, is turned by two intermeshed gears as the reference frame is pivoted about its mount on the guide bar. The intermeshed gears are operative to rotate the angle index dial through a greater angle than the miter angle by a six-to-one ratio to increase the resolution with which the miter angle is set. For example, a 15° change in the miter angle results in a 90° rotation of the angle index dial. Two embodiments show alternative ways to attach one of the gears and angle index dial to the guide bar and reference frame.

20 Claims, 5 Drawing Figures

MITER GAUGE

DESCRIPTION

1. Technical Field

This invention generally pertains to a miter device for use with a tool and specifically to a miter gauge with compact means for setting a miter angle with high resolution.

2. Background Art

Various types of wood and metal working tools such as table saws, jigsaws, and band saws use a miter device to establish the miter angle between a workpiece being machined or cut by the tool and the cutting line of the tool. Usually the miter device is designed to slide with the object being cut or machined, across a flat surface of the tool. One or more linear grooves machined into the flat surface of the tool, parallel to its cutting line, act to guide the gauge as it and the workpiece are moved together across the surface of the tool.

A common design for such miter gauges includes a slotted semi-circular frame pivotably attached to a rectangular guide bar that is dimensioned to slide within a groove on the tool. The frame is indexed around the circumference of the semi-circular arc with spaced apart graduations, representing a miter angle typically ranging from 0° to 60° or 0° to 45° on each side of the cutting line. The frame joining both ends of the arc usually has a planar surface disposed at right angles to the flat surface of the tool for alignment with a workpiece. A combination handle and screw clamp extending through the slot in the frame is used to clamp the frame at a desired miter angle relative to the guide bar, once the angle is set.

The conventional miter gauge described above is limited in resolution by the size of the semi-circular frame. It should be apparent that the larger the radius of the frame, the greater will be the distance between the angular graduations marked around its circumference. However, it is impractical to use a very large radius frame for such a gauge, since the sides of the miter gauge must clear the cutting line of the tool as the gauge and the workpiece are together pushed across the flat surface of the tool. A typical miter gauge has a semi-circular frame radius of about 3½ inches. The space in between its angular graduations is thus about 0.061 inches per degree. Where precise angles must be set on the miter gauge, the comparative lack of resolution of the conventional gauge substantially reduces its accuracy and precision.

It is therefore an object of this invention to substantially improve the resolution with which a miter angle can be set on a miter gauge.

A further object is to improve the accuracy and precision of a miter gauge without significantly increasing its size compared to a conventional miter device intended for use on the same tool.

A still further object is to increase the precision with which a miter angle is read on the miter gauge.

These and other objects of the invention will become apparent from the description of the preferred embodiments that follows hereinbelow and from the attached drawings.

SUMMARY OF THE INVENTION

The subject invention is a miter gauge with improved means for setting and resolving a miter angle between a workpiece and a tool. The gauge includes a guide bar adapted to slide within a groove on the tool, in a direction parallel to the bar's longitudinal axis. A reference frame is pivotably mounted on the guide bar and is adapted to support the workpiece as it is pushed across the tool. The miter angle is set using a graduated rotatably mounted angle index dial that turns as the reference frame is pivoted on its mount to the guide bar. Gear means are operative to rotate the angle index dial through a greater angle than the change in the miter angle, whereby the resolution in setting the miter angle is substantially increased.

Two embodiments of the invention involve different relationships in the manner in which the gear means and angle index dial are connected to the guide bar and reference frame. In one embodiment, the gear means include a first gear fixedly connected to the guide bar, and a second gear, intermeshed with the first, attached to the index dial. The dial is in turn, attached to the reference frame. In the second embodiment, the first gear is fixedly connected to the reference frame and the angle index dial is attached to the guide bar. In both embodiments, pivoting the reference frame relative to the guide bar causes the angle index dial to rotate through a substantially greater angle in accordance with the ratio between the first and second gears.

DISCLOSURE OF THE PREFERRED EMBODIMENTS

Figure 1:
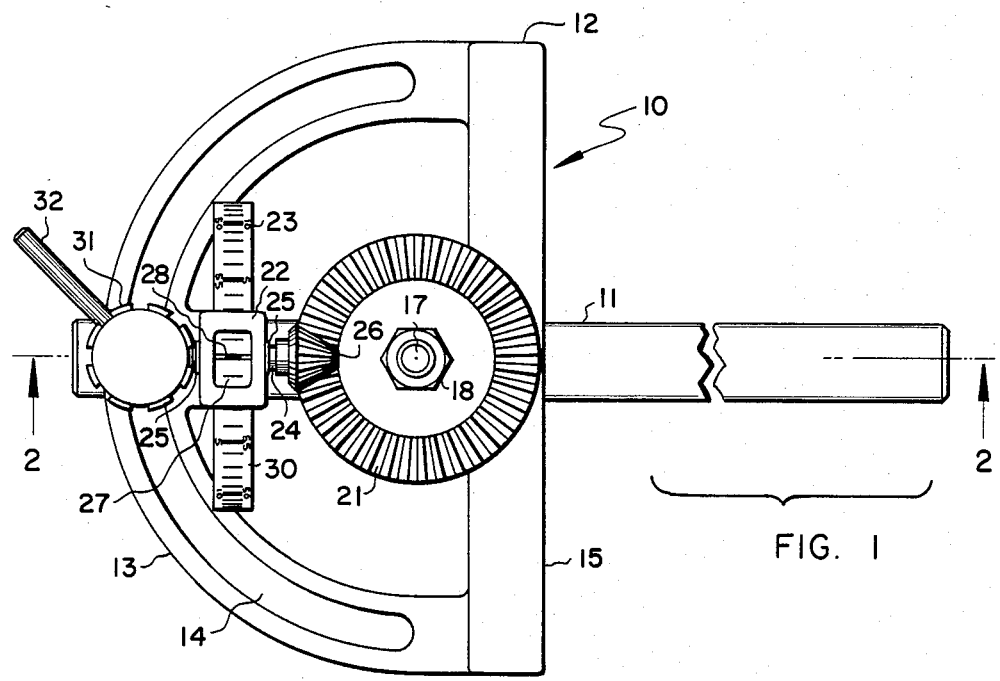
FIG. 1 is a plan view of the improved miter gauge showing the first embodiment.
Figure 2:
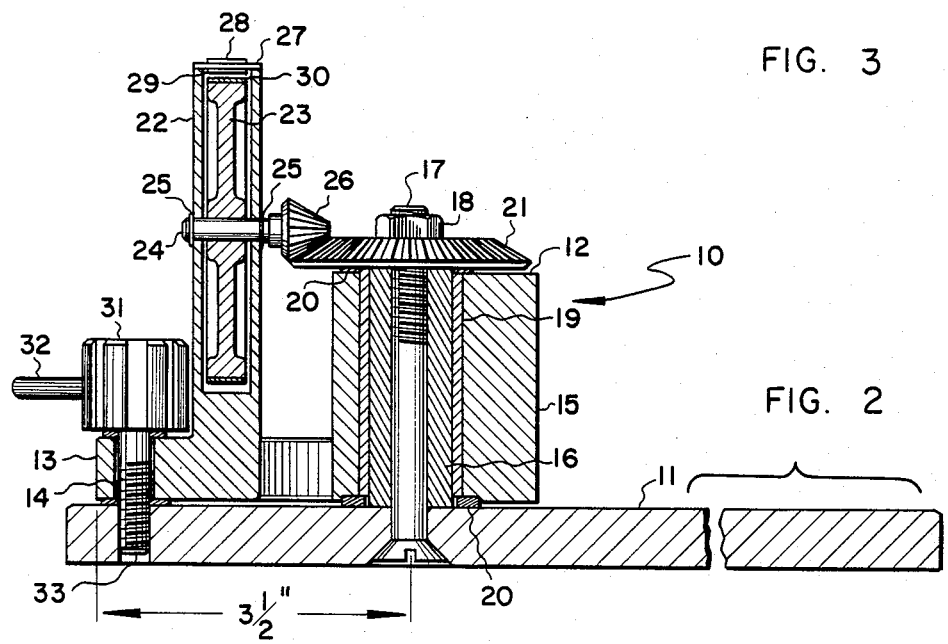
FIG. 2 is a cross-sectional view of the miter gauge shown in FIG. 1, taken along section lines 2—2.

With reference to FIGS. 1 and 2, a first embodiment of the miter gauge is generally designated by reference numeral 10. Miter gauge 10, includes a guide bar 11 of generally rectangular cross section, shown in foreshortened aspect for convenience in fitting the illustration of the gauge in the available space on the page. A reference frame 12 is pivotably mounted on guide bar 11, and comprises a semi-circular arc portion 13 that has a slot 14 formed therein in congruence with the arc, and a planar face 15, that is adapted to push a workpiece across a tool surface. Semi-circular arc 13 is joined at each end to the upwardly extending planar face portion 15. A lobe is formed on the back side of face 15 and is bored to accommodate a spacer pivot 16 that is attached to the guide bar 11 by means of bolt 17 and nut 18. A journal bearing 19 insures that reference frame 12 is free to freely pivot about the spacer pivot 16.

The head of bolt 17 is countersunk within the bottom of guide bar 11 so that it does not interfere with the sliding action of the bar within a groove formed on the tool (not shown). Nylon spacer washers 20 separate the lower surface of the reference frame 12 from the upper surface of guide bar 11, and are also used between the lower surface of a beveled ring gear 21 and the top surface of frame 12, thereby providing for the free pivotal motion of reference frame 12 about spacer pivot 16.

The beveled ring gear 21 is firmly seated against and attached to spacer pivot 16, which in turn is seated firmly against the guide bar 11, and the whole assembly is held in place by nut 18. Thus, beveled ring gear 21 is fixedly attached to guide bar 11.

An index wheel mount 22 extends upward from frame 12 at a point radially inward of the center of semi-circular arc 13. Index wheel mount 22 is deeply slotted to accept an angle index wheel 23 that is mounted on a wheel shaft 24. "C" clips 25 are fitted on wheel shaft 24 to hold it in index wheel mount 22. The angle index wheel 23 is force-fit on wheel shaft 24 (or may alternatively be held by a set screw), such that it turns when the shaft is rotated.

Mounted on one end of wheel shaft 24 and extending toward the beveled ring gear 21 is a pinion gear 26. Pinion gear 26 may be attached to shaft 24 either by means of a set screw (not shown) or by means of a press fit. Pinion gear 26 is disposed so that its teeth mesh with those of beveled ring gear 21.

The top surface of the index wheel mount 22 includes a reference window 27 that bridges the deep slot formed within the mount 22. Reference window 27 is made of transparent material, such as plastic, that includes an upper reference mark 28 and a lower reference mark 29, one above the other and extending parallel across reference window 27. The two reference marks 28 and 29 are aligned in use, to minimize parallax error in setting the miter gauge to a desired miter angle, as will be readily apparent to those skilled in the art. Reference marks 28 and 29 may be brightly colored or black, and are used on conjunction with a graduated scale 30 that extends around the circumference of angle index wheel 23.

Once a miter angle is set, the gauge must be locked in place. A clamping knob 31 is provided for this purpose and includes an optional lever 32 for increasing the torque that can be applied to the knob. Knob 31 is mounted to the guide bar 11 by means of a bolt 33 that extends through slot 14.

Beveled ring gear 21 and pinion gear 26 are selected such that the number of teeth on each is in a desired ratio. In the preferred embodiment, that ratio is six-to-one, i.e., beveled ring gear 21 might have 120 teeth, and pinion gear 26, 20 teeth, the teeth on each being of common size. It will thus be apparent that as reference frame 12 is pivoted relative to guide bar 11, pinion gear 26 rotates shaft 24, in turn causing angle index wheel 23 to rotate. Further, the angle of rotation of index wheel 23 is thus six times the angle of rotation of reference frame 12 relative to guide bar 11.

Figure 3:
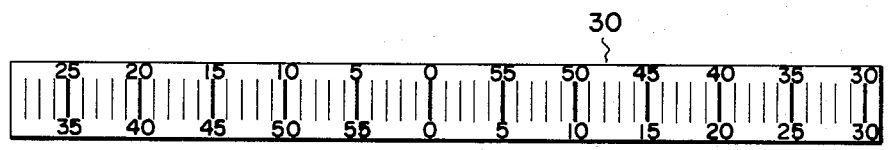
FIG. 3 is a view of the graduated scale used on the angle index dial of both embodiments of the miter gauge.

As shown in FIG. 3, graduated scale 30 extends from 0° to 60° in one direction of rotation, and 0° through 60° in the opposite direction of rotation. Graduated scale 30 is represented as a band in FIG. 3. however it will be apparent that such a band made from embossed plastic may be glued, or otherwise suitably attached around the entire circumference of angle index wheel 23. Scale 30 is positioned so that when the planar face 15 forms a 90° angle with the longitudinal axis of guide bar 11, the index scale mark 0 is centered below reference marks 28 and 29 under reference window 27. For an angle index wheel diameter of 2½ inches, the distance between angle marks per degree equals approximately 0.131 inches. By comparison, on a conventional miter gauge having approximately the same 3½ semi-circular frame radius, the distance between angle markings around the circumference of the arc is approximately 0.061 inches, as noted above. Thus the improved miter gauge 10 provides twice the angular resolution, along with the increased precision afforded by use of parallax eliminating reference marks 28 and 29. One revolution of the angle index wheel through 360° rotation corresponds to a change in the miter angle of 60°. Other angle ranges such as 0°–30° or 0°–45° are possible, merely by changing the ratio between pinion gear 26 and beveled ring gear 21.

Figure 4:
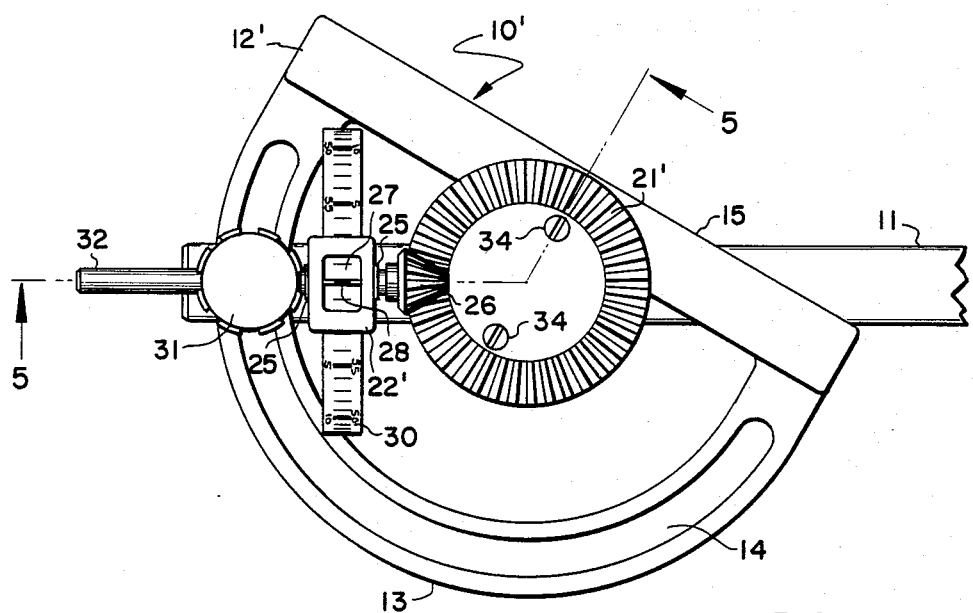
FIG. 4 is a plan view of the second embodiment of the miter gauge set at a miter angle of about 60°.
Figure 5:
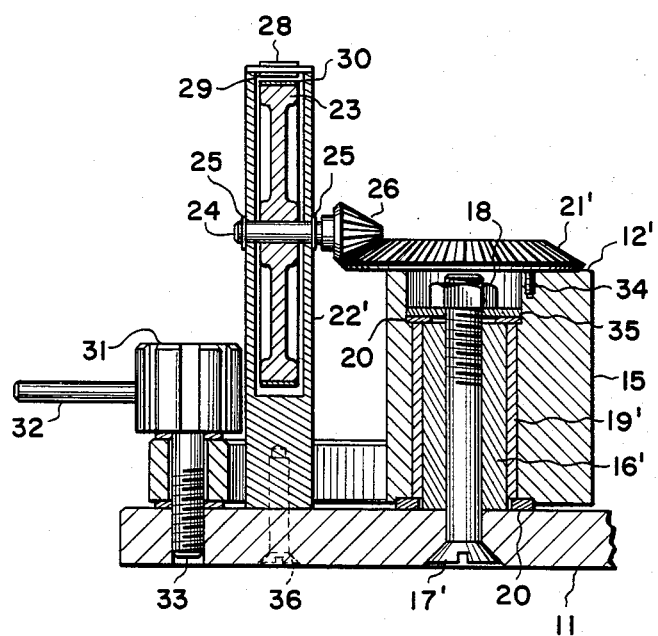
FIG. 5 is a cross-sectional view of the second embodiment taken along section lines 5—5 of FIG. 4.

A second embodiment of the invention is shown in FIGS. 4 and 5. Common reference numerals are used for the various elements of the second embodiment, where appropriate, and prime designations are used with the numerals when these elements are different from those in the first embodiment. The second embodiment of the miter gauge is generally denoted by reference numeral 10′. Like the first embodiment, it includes a guide bar 11, on which is pivotably mounted a reference frame 12′. Frame 12′ also includes a planar surface 15 and a semi-circular arc 13 with congruent slot 14, however, beveled ring gear 21′ is fixedly attached by means of machine screws 34 to frame 12′.

A spacer pivot 16′ is mounted by means of bolt 17′ and nut 18 below beveled ring gear 21′. In this pivoting arrangement, washer 35 is used in conjunction with nylon spacer washers 20 to pivotably mount the reference frame 12′ to guide bar 11. Since beveled ring gear 21′ is fixedly attached to reference frame 12′, angle index wheel 23 must be mounted on guide bar 11 to achieve relative movement of pinion gear 26 about beveled ring gear 21 as the frame is pivoted. A machine screw 36 is used to attach index wheel mount 22′ to guide bar 11, at a point radially inside the semi-circular arc 13. With this mounting relationship, the angle index dial 23 is caused to rotate as guide bar 11 is pivoted relative to reference frame 12′ due to the intermeshed relationship of pinion gear 26 and beveled ring gear 21. Other elements of the second embodiment are generally similar to those of the first embodiment and the miter gauge functions in a similar fashion to increase the resolution with which the miter angle may be set to a predetermined point.

Alternative means for establishing a reference mark besides disclosed dual reference marks 28 and 29 may be used to eliminate parallax. For example, a silvered surface on graduated scale 30, viewed so as to eliminate an apparent reflection of a single reference mark would likewise minimize parallax error. This and other modifications will be apparent to those skilled in the art within the scope of the claims which follow hereinbelow.

I claim:

1. A miter gauge for establishing a miter angle between a workpiece and a tool, said miter gauge comprising
   a. a guide bar adapted to slide within a groove, in a direction parallel to the bar's longitudinal axis;
   b. a reference frame pivotably mounted on the guide bar and adapted to support the workpiece as it is pushed across the tool;
   c. a rotatably mounted angle index dial graduated to show the miter angle at which the gauge is set; and
   d. gear means for turning the angle index dial as the reference frame is pivoted on its mount to the guide bar, said gear means being further operative to rotate the angle index dial through a greater angle than the change in the miter angle, whereby the resolution in setting the miter angle is increased substantially.

2. The miter gauge of claim 1 wherein the gear means include a first gear fixedly connected to the guide bar, and a second gear attached to the angle index dial, and wherein said angle index dial is attached to the reference frame, and the first and second gears are disposed in intermeshed relationship.

3. The miter gauge of claim 1 wherein the gear means include a first gear fixedly connected to the reference frame, and a second gear attached to the angle index dial, and wherein said angle index dial is attached to the guide bar, and the first and second gears are disposed in intermeshed relationship.

4. The miter gauge of claim 1 further comprising means for clamping the reference frame to the guide bar at a desired miter angle setting.

5. A miter gauge for establishing a miter angle between a workpiece and a tool, said miter gauge comprising
   a. a guide bar adapted to slide within a groove, in a direction parallel to the bar's longitudinal axis;
   b. a reference frame pivotably mounted on said guide bar, and including a planar surface forming an adjustable angle with said axis of the guide bar, the planar surface being adapted to support the workpiece as it is pushed across the tool;
   c. an angle index dial attached to a shaft rotatably mounted on the miter gauge, said dial being marked to indicate the miter angle; and
   d. fixed ratio gear means connecting the reference frame and the guide bar, said gear means being operative to rotate the angle index dial through an angle proportionately greater than the change in the miter angle as the reference frame is pivoted about its mount, according to the fixed ratio of the gear means, whereby the resolution of the miter angle setting is substantially improved.

6. The miter gauge of claim 5 wherein the fixed ratio gear means comprise a first gear fixedly connected to the guide bar, and a second gear connected to the shaft, said second gear being operative to rotate the angle index dial; and wherein said shaft is mounted on the reference frame.

7. The miter gauge of claim 6 wherein the first and second gears each include a plurality of teeth, the first gear substantially more than the second, and wherein the first gear comprises at least a segment of a ring gear and the second gear is a pinion gear.

8. The miter gauge of claim 5 wherein the fixed ratio gear means comprise a first gear connected to the reference frame and a second gear connected to the shaft, said shaft being operative to rotate the angle index dial; and wherein said shaft is mounted on the guide bar.

9. The miter gauge of claim 8 wherein the first and second gears each include a plurality of teeth, the first gear substantially more than the second and wherein the first gear comprises at least a segment of a ring gear, and the second gear is a pinion gear.

10. The miter gauge of claim 5 wherein the reference frame includes a curved slot and means for clamping the guide bar to the reference frame at a desired miter angle setting, said clamping means extending through the curved slot.

11. The miter gauge of claim 5 further comprising a slotted member in which the angle index dial is mounted, said slotted member including a reference mark that indicates the miter angle.

12. The miter gauge of claim 11 wherein the angle index dial is round and includes graduated angle index marks on its circumferential surface.

13. The miter gauge of claim 5 wherein the fixed ratio of the gear means is six-to-one.

14. A miter gauge for establishing a miter angle between a workpiece and a tool said miter gauge comprising
   a. a guide bar adapted to slide within a groove in the tool in a direction parallel to the longitudinal axis of the guide bar;
   b. a reference frame comprising a generally flat semi-circular portion connected to a crosspiece having a planar surface that is substantially perpendicular relative to the semi-circular portion, and adapted to support the workpiece as it is pushed across the tool, said reference frame being pivotably mounted on the guide bar so that the angle between the planar surface and the longitudinal axis of the guide bar is adjustable;
   c. an angle index dial, with graduated index marks around its circumference to denote the miter angle of the gauge, said index dial being attached to a shaft rotatably mounted within a slotted block and disposed on the same side of the crosspiece as the semi-circular portion;
   d. fixed ratio gear means operative to rotate the angle index dial as the reference frame is pivoted on its mount relative to the guide bar, said gear means including a first gear and a second gear in intermeshed relationship, the first gear being at least a segment of a ring gear disposed in a plane generally parallel to the shaft, and the second gear being a pinion gear attached to the shaft, the fixed ratio of the first and second gears being selected so that the angle index dial is rotated through a substantially greater angle than the change in the miter angle as the reference frame is pivoted on its mount, thereby increasing the angle setting resolution of the miter gauge.

15. The miter gauge of claim 14 wherein the first gear is fixedly connected to the guide bar, and wherein the slotted block supporting the second gear is attached to the reference frame.

16. The miter gauge of claim 14 wherein the first gear is fixedly connected to the reference frame and wherein the slotted block supporting the second gear is attached to the guide bar.

17. The miter gauge of claim 14 wherein the slotted block includes a reference mark which when aligned with a graduated index mark on the angle index dial, indicates the miter angle at which the gauge is set.

18. The miter gauge of claim 14 wherein the fixed ratio of the first and second gears is six-to-one such that the shaft and index dial move through 360 degrees as the miter angle changes by sixty degrees.

19. The miter gauge of claim 18 wherein the angle index dial is graduated in a dual scale from zero through sixty degrees in both directions of rotation.

20. The miter gauge of claim 14 wherein the semi-circular portion of the reference frame includes a curved slot, further comprising means for clamping the guide bar to the reference frame at a desired miter angle setting, said clamping means extending through the slot.

* * * * *

UNITED STATES PATENT AND TRADEMARK OFFICE
CERTIFICATE OF CORRECTION

PATENT NO. : 4,514,909
DATED : May 7, 1985
INVENTOR(S) : CURTIS R. GILBERT

It is certified that error appears in the above-identified patent and that said Letters Patent is hereby corrected as shown below:

On the title page, the address of the Inventor should be corrected by replacing "501 W. Gilbert" with --501 W. Gillette--

Signed and Sealed this

First Day of April 1986

[SEAL]

Attest:

DONALD J. QUIGG

Attesting Officer

Commissioner of Patents and Trademarks